United States Patent
Pepper et al.

(10) Patent No.: US 10,476,776 B2
(45) Date of Patent: Nov. 12, 2019

(54) METHODS, SYSTEMS AND COMPUTER READABLE MEDIA FOR WIDE BUS PATTERN MATCHING

(71) Applicant: Keysight Technologies, Inc., Minneapolis, MN (US)

(72) Inventors: Gerald Raymond Pepper, Newbury Park, CA (US); Marie Stanek Wyszynski, Westlake Village, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 56 days.

(21) Appl. No.: 15/916,227

(22) Filed: Mar. 8, 2018

(65) Prior Publication Data

US 2019/0280957 A1   Sep. 12, 2019

(51) Int. Cl.
*H04L 12/26*   (2006.01)
*H04L 29/06*   (2006.01)
*H04L 12/40*   (2006.01)

(52) U.S. Cl.
CPC ........ *H04L 43/18* (2013.01); *H04L 12/40032* (2013.01); *H04L 43/12* (2013.01); *H04L 69/22* (2013.01)

(58) Field of Classification Search
USPC ....................................................... 370/250
See application file for complete search history.

(56) References Cited

U.S. PATENT DOCUMENTS

| | | |
|---|---|---|
| 6,999,891 B2 | 2/2006 | Pepper |
| 7,308,561 B2 | 12/2007 | Cornet et al. |
| 7,328,362 B2 * | 2/2008 | Chiang .............. H04J 3/0602 370/516 |
| 7,373,454 B1 | 5/2008 | Noe |
| 9,577,669 B2 | 2/2017 | Schwenk et al. |
| 2003/0007690 A1 | 1/2003 | Rajagopal et al. |
| 2003/0110208 A1 | 6/2003 | Wyschogrod et al. |
| 2005/0132107 A1 * | 6/2005 | Cornet .................... G06F 7/02 710/71 |
| 2014/0173094 A1 | 6/2014 | Majumdar et al. |
| 2017/0093715 A1 | 3/2017 | McGhee et al. |

* cited by examiner

*Primary Examiner* — Natasha W Cosme

(57) ABSTRACT

A method for wide bus pattern matching includes, receiving, in a first clock cycle, a bus width of data from a data bus. The method further includes using pattern compare blocks to compare each n-bit portion of data from the data bus to a plurality of different n-bit pattern portions, n being an integer equal to a smallest boundary in which a pattern can start on the data bus. The method further includes detecting, using a plurality of diagonal detectors, matching pattern portions across the pattern compare blocks that are arranged in a diagonal. The method further includes detecting, using a packet boundary detector, when the matching pattern portions arranged in a diagonal indicate a matching pattern that falls within a set of packet boundaries. The method further includes indicating a positive match when the packet boundary detector indicates that the matching.

20 Claims, 7 Drawing Sheets

METHODS, SYSTEMS AND COMPUTER READABLE MEDIA FOR WIDE BUS PATTERN MATCHING

TECHNICAL FIELD

The subject matter described herein relates to identifying patterns on a data bus. More particularly, the subject matter described herein relates to methods, systems, and computer readable media for wide bus pattern matching.

BACKGROUND

Network equipment test devices transmit and receive packets at line rates to test the performance and functionality of network equipment. Line rate refers to the data transfer speed supported by the physical layer interface to the communications medium. For example, for 40 gigabit Ethernet, the line rate is 40 Gb/s.

Although the physical layer chips (PHYs) are capable of transmitting and receiving bits over the communications medium at line rates, the field programmable gate arrays (FPGAs) used to process transmitted and received bits often cannot do so at a speed necessary to keep up with line rate transmission and reception. To address this issue, one design approach taken by FPGA developers involves the implementation of architectures that parallelize processing tasks that are to be performed by FPGA devices. One possible parallelization strategy involves increasing the width of the internal communications bus that is used transmit and receive data and using plural FPGA devices to process different segments of the bus in parallel during each clock cycle.

On the receive side, FPGAs can be used in parallel to scan the data bus for patterns known to be present in received data. However, using FGPA devices in parallel can require complex logic circuit design and duplicate logic circuit components to detect patterns of bits on the data bus. The logic design can increase in complexity and numbers of required components to account for cases were more than one packet is present on the bus during one clock cycle and when a matching pattern spans more than one clock cycle. Accordingly, there exists a need for methods, systems, and computer readable media for wide bus pattern matching.

SUMMARY

The subject matter described herein includes methods, systems, and computer readable media for wide bus pattern matching. One method for wide bus pattern matching includes, receiving, in a first clock cycle, a bus width of data from a data bus. The method further includes using pattern compare blocks to compare each n-bit portion of data from the data bus to a plurality of different n-bit pattern portions, n being an integer equal to a smallest boundary in which a pattern can start on the data bus. The method further includes detecting, using a plurality of diagonal detectors, matching pattern portions across the pattern compare blocks that are arranged in a diagonal. The method further includes detecting, using a packet boundary detector, when the matching pattern portions arranged in a diagonal indicate a matching pattern that falls within a set of packet boundaries. The method further includes indicating a positive match when the packet boundary detector indicates that the matching.

A system for wide bus pattern matching includes a network equipment test device including at least one processor. The network equipment test device includes a plurality of pattern blocks configured to compare each n-bit portion of data received from a data bus during a first clock cycle to a plurality of different n-bit pattern portions, n being an integer equal to a smallest boundary in which a pattern can start on the data bus. The system further includes a plurality of diagonal detectors for detecting matching pattern portions across the pattern compare blocks that are arranged in a diagonal. The system further includes a packet boundary detector for detecting when the matching pattern portions arranged in a diagonal indicate a matching pattern that falls within a set of packet boundaries and indicating a positive match when the packet boundary detector indicates that the matching pattern falls within the set of packet boundaries.

The subject matter described herein for wide bus pattern matching may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
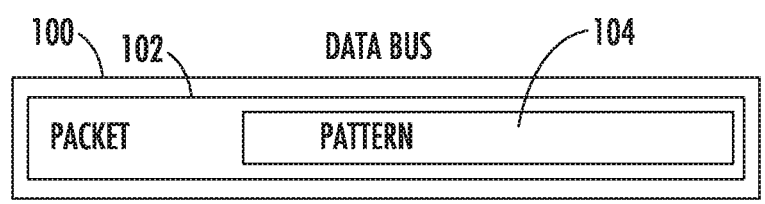
FIG. 1 is a block diagram of a data bus with a single packet having a single pattern present on the bus during a clock cycle.

The subject matter described herein related to methods, systems, and computer readable media for wide bus pattern matching. The subject matter described herein will operate to detect matching patterns on a data bus when the bus contains all or part of a pattern and one or more packets during a clock cycle. FIG. 1 is a block diagram of a packet on a data bus during a clock cycle. In FIG. 1, data bus 100 is 128 bytes wide and includes a packet 102 that is also 128 bytes wide. A pattern 104 is located in the packet. In the illustrated example, the entire pattern 104 is present on the bus during a single clock cycle. Detecting pattern 104 may involve comparing n-bit portions of data on data bus 100 to n-bit pattern portions, where n is an integer equal to the smallest boundary in which a pattern can start. For example, if a pattern can start on 16-bit boundaries, then n equals 16 and each 16-bit portion of data bus 100 must be compared to each possible n-bit pattern portion. Thus, if a pattern is 64 bits in length, each 16-bit portion of data on data bus 100 must be compared with each of 4 16-bit pattern portions.

Figure 2:
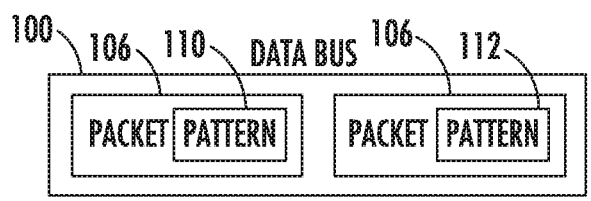
FIG. 2 is a block diagram of a data bus with two packets having two patterns present on the data bus during a clock cycle.

FIG. 2 illustrates the case where, during a single clock cycle, the data bus 100 includes two different packets 106 and 108, each of which may include a pattern 110 or 112 to be detected. This case is slightly more complex than the scenario illustrated in FIG. 1, because pattern matchers that scan the communications bus must be capable of detecting multiple patterns in multiple packets during the same clock cycle. The possibility of multiple packets on the bus during a clock cycle requires that the pattern detection logic be aware of packet boundaries.

Figure 3:
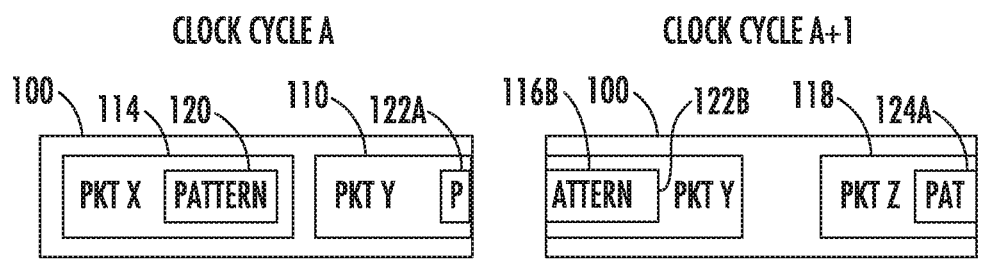
FIG. 3 is a block diagram illustrating a communications bus at two different clock cycles with partial packets and partial packet patterns on the bus during the different clock cycles.

FIG. 3 illustrates yet another case where, during first clock cycle, clock cycle A, all of one packet, packet X 114, is present on data bus 100, and a portion 116A of packet Y is present on data bus 100. In the next clock cycle, clock cycle A+1, the remainder 116B of packet Y and a portion 118 of packet Z is present on the data bus 100. During clock cycle A, all of pattern 120 in test packet X 114 is present on the communications bus. However, the pattern for packet Y is split across clock cycles A and A+1 as pattern portions 122A and 122B. Similarly, the pattern for packet Z includes a partial pattern portion 124A that is present on bus 100 during clock cycle A+1, and another partial pattern portion that will appear on bus 100 during a subsequent clock cycle where another portion appears in a subsequent clock cycle. This case is even more complex than that of FIG. 2, because pattern detection logic must account for partial matches and matches across more than one clock cycle. A wide bus pattern matcher as described herein is capable of handling each of these cases.

Figure 4:
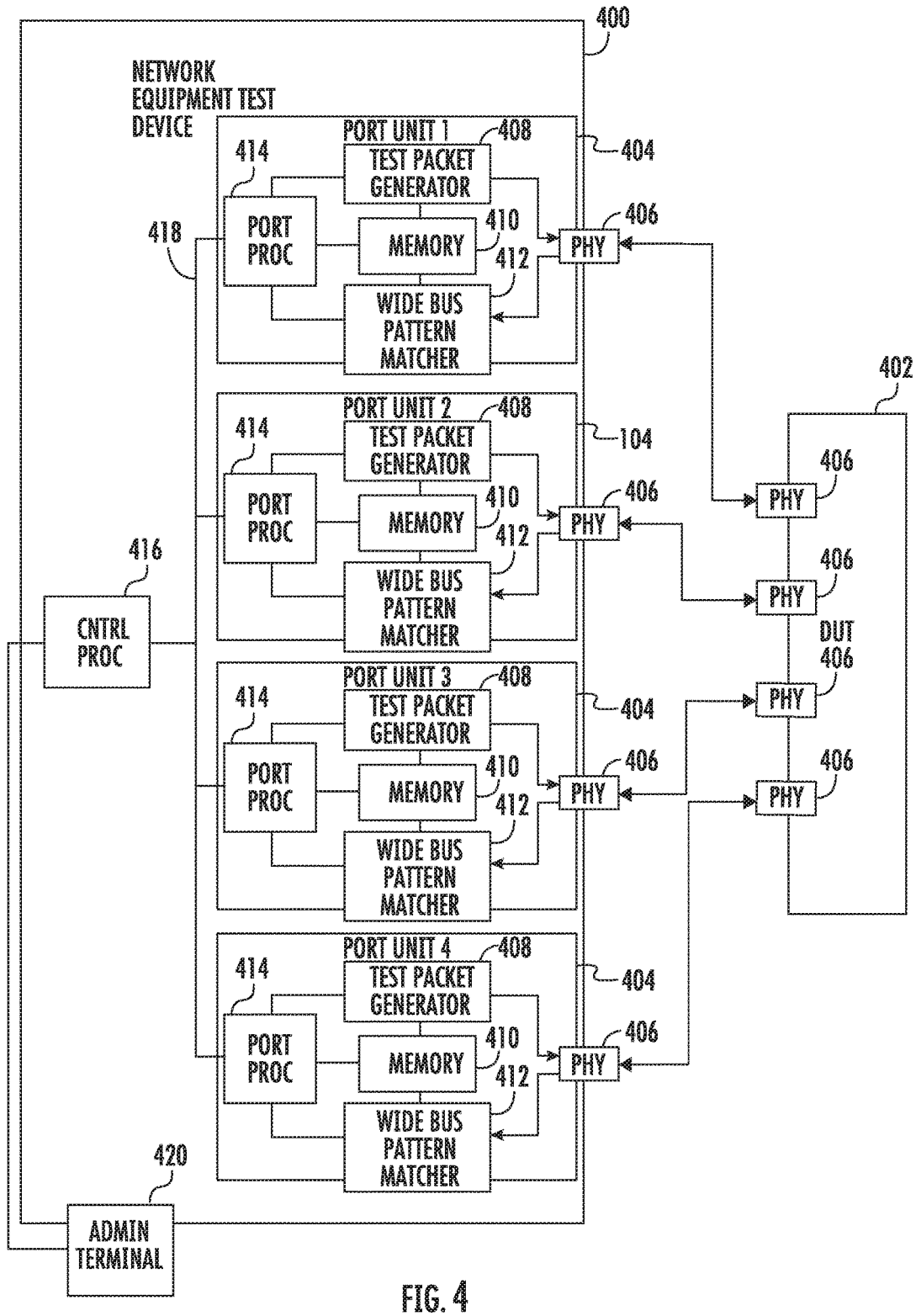
FIG. 4 is a block diagram of a network equipment test device including a wide bus pattern matcher for detecting bit patterns received or a data bus.

Before explaining the pattern matching architecture in detail, an architecture of a network equipment test device in which wide bus pattern matching can be implemented will be explained. FIG. 4 illustrates such an architecture. Referring to FIG. 4, a network equipment test device 400 is configured to generate test packets and transmit the test packets to a device under test 402. Network equipment test device 400 is also configured to receive test packets from device under test 402. It is during the receiving process where wide bus pattern matching as described herein can be implemented. Device under test 402 may be any suitable network device that includes networking capabilities. For example, device under test 402 may be a router, a switch, a firewall, or a network address translator.

In the illustrated example, network equipment test device 400 includes a plurality of port units 404 that transmit test packets to device under test 402 and receive test packets from device under test 402 via physical layer chips 406. Each physical layer chip 406 includes a transmitter for transmitting bit sequences to DUT 402 and a receiver for receiving bit sequences from DUT 402. In one example, each physical layer chip 406 may be implemented using an Ethernet transceiver.

Each port unit 404 may be implemented as all or part of a printed circuit board mounted in a chassis. In the illustrated example, each port unit 404 includes a test packet generator 408, memory 410, a wide bus pattern matcher 412, and a port processor 414. Test packet generator 408 of each port unit generates test packets to be transmitted to device under test 402. In one example, each test packet generator 408 generates patterns that start on predetermined boundaries and that have predetermined sizes. The boundary at which a pattern can start in a packet can be configurable by the test system user. In one example, the test packets may start on 16 bit or word boundaries. However, the subject matter described herein is not limited to detecting patterns that can start on any one boundary. Detecting patterns that can start on any user-configurable boundary is intended to be within the scope of the subject matter described herein.

Memory 410 stores test configuration information and test results. For example, memory 410 may store the patterns that are transmitted to device under test 402 during a test and that are detected by wide bus pattern matchers described herein. The patterns may be defined by the test system user at configuration time. Port processor 414 controls the overall operation of each port unit 404. In addition, each port processor 414 may communicate with a control processor 416 over a backplane 418. Control processor 416 may control the overall operation of network equipment test device 400. Control processor 416 may also control communications between admin terminal 420 and port processors 414. Admin terminal 420 may be a general purpose computer through which a test system operator configures network equipment test device 400 and views output generated by network equipment test device 400.

In the test scenario illustrated in FIG. 4 device under test 402 routes packets back to network equipment test device 400. Wide bus pattern matchers 412 scan the data buses of their respective port units 404 to detect full and partial matching patterns on the bus, identify matching patterns that form a diagonal, and identify, from the matching patterns that form a diagonal, consecutive matching patterns that occur within packet boundaries.

Figure 5A:
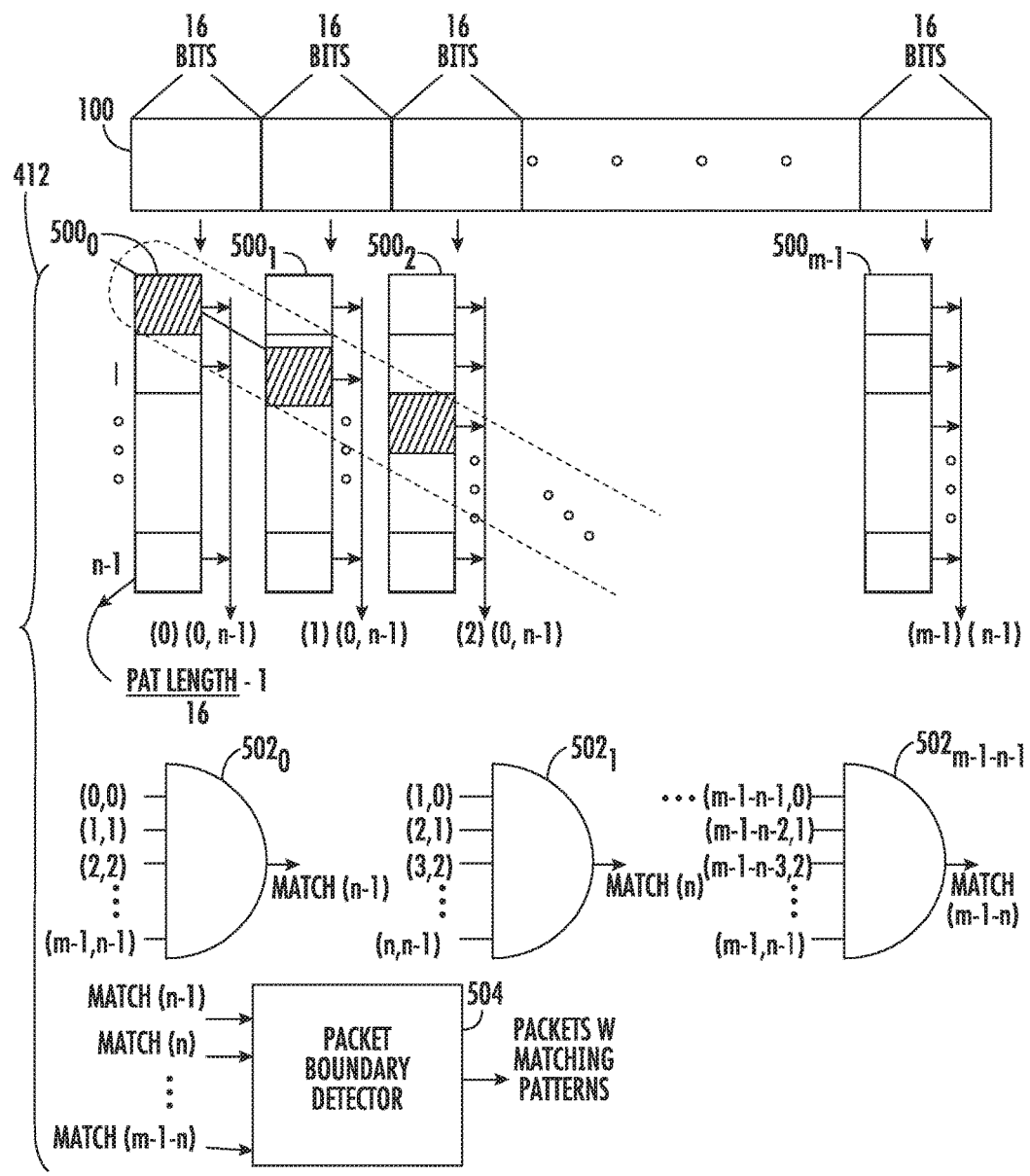
FIG. 5A is a block and logic diagram of an exemplary architecture for a wide bus pattern matcher and illustrating how the architecture detects a full pattern match during a single clock cycle.

FIG. 5A is a diagram illustrating an exemplary architecture for wide bus pattern matcher 412. Referring to FIG. 5A, data bus 100 is divided into 16-bit pattern portions because, in this example, it is assumed that patterns start on 16-bit boundaries. Wide bus pattern matcher 412 includes a plurality of pattern compare blocks 500 that each comprise a comparator that compares a 16-bit portion of data on bus 100 to each possible 16-bit pattern portion in the pattern to be detected. For example, the pattern compare block $500_0$ for the first 16-bit portion of the data bus compares the first 16-bits of data from the data bus to pattern portion 0, pattern portion 1, through the last 16-bit pattern portion, which is indexed as (0, n−1), where the first index represents column 0 or pattern compare block $500_0$, and the second index, n−1, represents the last cell in pattern compare block $500_0$. In the illustrated example, the value of the second index n−1 for the last cell in each of the pattern compare blocks is equal to (pattern length/16)−1. The index n represents the total number of 16-bit portions in the pattern. Thus, if the pattern is 128 bits in length, and the smallest bus boundary in which a pattern can start is 16 bits, n=8 and each pattern compare block 500 will have 8 cells.

Each pattern compare block $500_0$ through $500_{m-1}$, where m is the number of 16 bit portions on data bus 100, compares its respective 16 bit portion of bus 100 to each of the 0 to n−1 portions of the pattern and outputs a 1 for the matching cell if the pattern portion on the bus matches one of the cells. If the first 16-bit pattern on data bus 100 matches cell (0, 0), the output of pattern compare block 500$_0$ would be a 1 or high for cell (0, 0). If the first 16-bit pattern on data bus 100 matches cell (0,1), then the output of pattern compare block 500$_0$ would be a 1 or high for cell (0,1). The output for the remaining cells of pattern compare block 500$_0$ whose patterns do not match the first pattern on data bus 100 would be 0.

The output of pattern compare blocks are provided to diagonal detectors 502$_0$ to 502$_{m-1-n}$. Each diagonal detector is a logic gate, which in the illustrated example is implemented as an AND gate that ANDs its inputs to produce a high output (logic level 1), when all of the inputs are high and a low output (logic level 0) otherwise. Each diagonal detector 502 receives as input, the output of a given set of cells of pattern compare blocks 500 that form a diagonal pattern across the pattern compare blocks. For example, diagonal detector 502$_0$ receives the output of cell (0,0) of pattern matcher 500$_0$, the output of cell (1, 1) of pattern compare block 500$_1$, the output of cell (2, 2) of pattern compare block 500$_2$ and the output of cell (m-1, n-1) of pattern compare block 500$_{m-1}$. In FIG. 5A, the set of dashed lines around cells (0, 0), (1, 1), (2, 2) . . . , is an example of a diagonal pattern that may be detected by diagonal detector 502$_0$. Each diagonal detector 502 thus detects when matching cells of pattern compare blocks 500 form a diagonal pattern indicating consecutive matching pattern portions on bus 100. For example, diagonal detector 502$_0$ outputs a signal match(n-1) when a diagonal starts a cell (0,0) and ends on cell (m-1, n-1). The signal match(n-1) indicates that column (n-1) contains that last word of the matching pattern. Similarly, diagonal detector 502$_1$ outputs a signal match(n) when a diagonal starts at cell (1, 0) and ends on cell (m, n-1). The signal match(n) indicates that the last pattern portion of a set of pattern portions that form a diagonal occurs in column (n). The signal match (m-1-n) indicates that the last pattern portion of a set of pattern portions that form a diagonal occurs in column (m-n-1).

Also illustrated in FIG. 5A is a packet boundary detector 504. Packet boundary detector 504 determines when a set of matching pattern portions that form a diagonal detected by from one of diagonal detectors 502$_0$-502$_{m-1}$ occurs within a set of packet boundaries. If a set of matching pattern portions that form a diagonal occurs within a set of packet boundaries, packet boundary detector 504 outputs a signal that indicates a positive match. If the match does not occur within a set of packet boundaries, for example, the set matching patterns spans two or more packets, packet boundary detector 504 may identify the match as false.

Figure 5B:
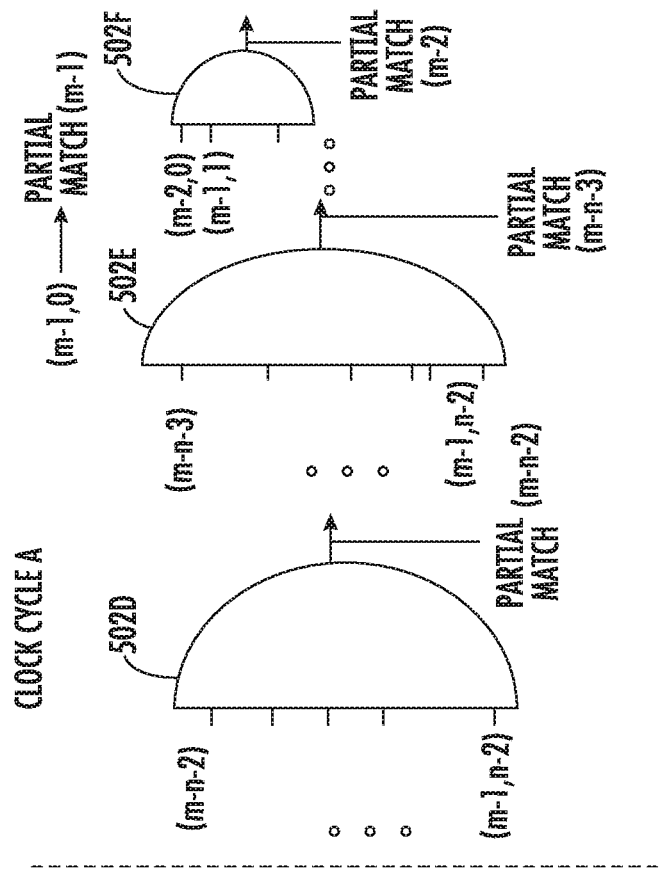
FIG. 5B is a block diagram of the wide bus pattern matcher illustrating how the architecture detects a partial pattern match during one clock cycle and the remainder of the pattern match during a subsequent clock cycle.
Figure 5B:
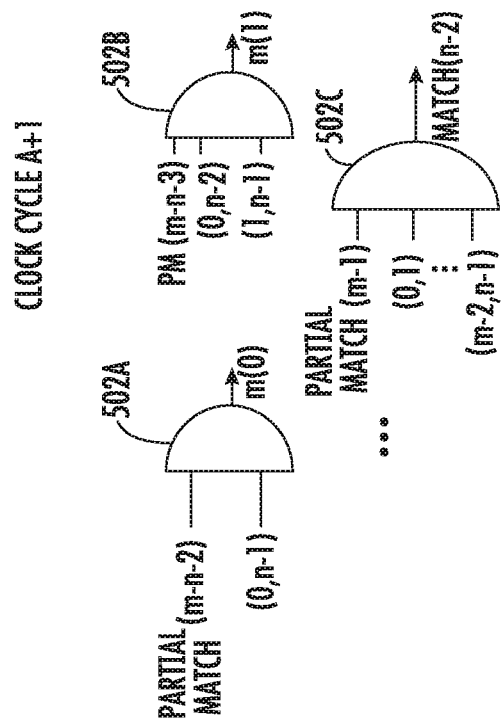

FIG. 5A illustrates the detection of a complete matching pattern on bus 100 during a single clock cycle. FIG. 5B illustrates the detection of a partial match during one clock cycle and the detection of the remainder of the matching pattern during a subsequent clock cycle. The structure of pattern compare blocks 500 and packet boundary detector 504 may be the same as that illustrated in FIG. 5A and are omitted from FIG. 5B for simplicity. Referring to FIG. 5B, diagonal detectors 502D, 502E, and 502F output partial match signals when a partial match is detected on specific portions of the bus during a first clock cycle, which is labeled clock cycle A. For example, diagonal detector 502D outputs a signal partial match(m-n-2) when a partial match is detected that starts at column m-n-2 and ends in column m-1 on clock cycle A. Similarly, diagonal detector 502E outputs a signal partial match(m-n-3) when a partial match starts in column m-n-3 and ends in column n-1 on clock cycle 0. Diagonal detector 502F outputs a signal partial match(n-2) when a partial match starts in column n-2 and ends in column n-1 during clock cycle A. When a partial match starts in column n-1, i.e., the last column on the bus, that signal may simply be output as partial match(m-1) without going through a diagonal detector.

For clock cycle A+1, diagonal detectors 502A, 502B, and 502C receive the partial match signals from clock cycle A and output full match signals when the remainder of the pattern that started on clock cycle A is completed during clock cycle A+1. For example, diagonal detector 502A receives the signal partial match(m-n-2) from clock cycle A and the signal (0, n-1), indicating that all of the pattern except for one pattern portion was matched during clock cycle A and the remainder of the matching pattern occurs in column 0 during clock cycle A+1. Diagonal detector 502A outputs the signal m(0) indicating that the full matching pattern ends in column 0 on clock cycle A+1. Diagonal detector 502B receives as inputs the signal partial match (m-n-3) from clock cycle A and signals (0, n-2) and (1, n-1), indicating that the last two matching pattern portions occur in columns 1 and 2 on clock cycle A+1. Diagonal detector 502B outputs the signal m(1) indicating that the second column in clock cycle A+1 contains the last matching pattern portion. Diagonal detector 502C receives as inputs the signals partial match(m-1) and the signals (0, 1)-(m-2, n-1), indicating that the first matching pattern portion occurs during clock cycle A and the remaining n-1 pattern portions occur in clock cycle A+1. Diagonal detector 502C outputs the signal match(n-2) indicating that the last matching pattern portion occurs in column n-2 on clock cycle A+1. Accordingly, using the structure in FIG. 5B, matching patterns that occur across clock cycles can be identified.

Figure 6:
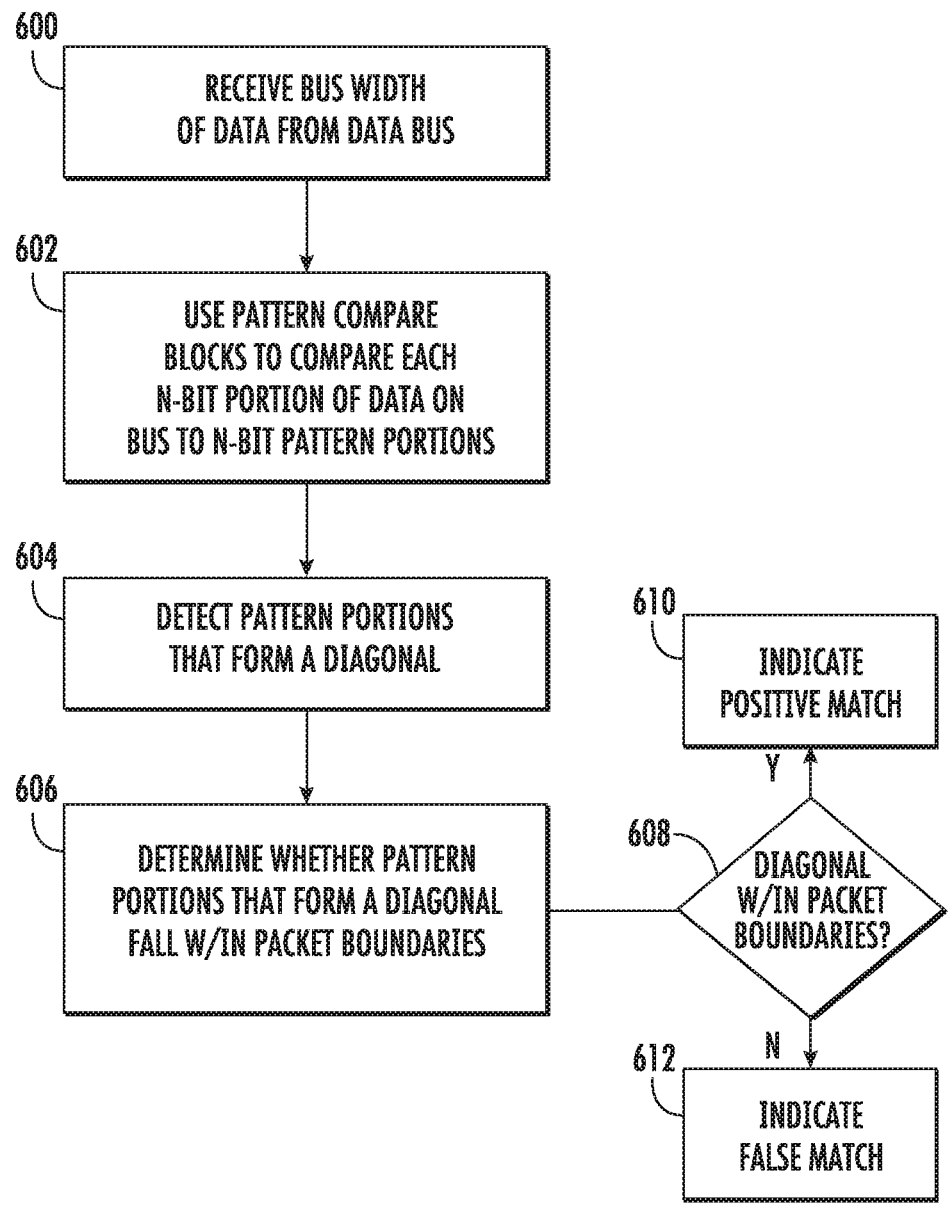
FIG. 6 is a flow chart illustrating an exemplary process for wide bus pattern matching.

FIG. 6 is a flow chart illustrating an exemplary process for wide bus pattern matching according to the subject matter described herein. Referring to FIG. 6, in step 600, a bus width of data is received during a first clock cycle. For example, a receive data bus associated with network equipment test device 400 may receive a bus width of data. The bus may be on one of port units 404 that receives data after the data is output from its respective physical layer chip 406.

In step 602, pattern compare blocks are used to compare each n-bit portion of data on the data bus with a plurality of n-bit pattern portions. For example, pattern compare blocks 500 may each compare their respective data bus portion to the pattern portions of a pattern being detected. The pattern may be a known pattern inserted in data transmitted by the network equipment test device to the device under test. The device under test returns the data to the network equipment test device. The network equipment test device needs to detect the patterns in received data packets to identify and classify received packets. For example, the patterns inserted in transmitted packets may be packet group identifiers used by the receive side circuitry of the network equipment test device to identify packets associated with the same flow.

In step 604, diagonal detectors are used to detect matching pattern portions across the pattern across the pattern compare blocks. For example, diagonal detectors 502 may be used to detect consecutive portions of data on the data bus that match consecutive pattern portions of the pattern. An example of consecutive matching pattern portions that form a diagonal is illustrated in FIG. 5A. The consecutive matching patterns may occur in different clock cycles and may be detected using the structure out of the diagonal detectors illustrated in FIG. 5B.

In step 606, packet boundaries are detected, and it is determined whether in step 608 the matching pattern portions arranged in a diagonal occur within a set of packet boundaries. For example, packet boundary detector 504 may determine when a diagonally arranged set of consecutive matching pattern portions occurs within a set of packet boundaries. If the consecutive matching pattern portions occur within a set of packet boundaries, control proceeds to step 610 where a match is indicated. If the set of matching patterns does not occur within a set of packet boundaries, control proceeds to step 612 where the match is false.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for wide bus pattern matching, the method comprising:
   in a network equipment test device including at least one processor:
      receiving, in a first clock cycle, a bus width of data from a data bus;
      using pattern compare blocks to compare each n-bit portion of data from the data bus to a plurality of different n-bit pattern portions, n being an integer equal to a smallest boundary in which a pattern can start on the data bus;
      detecting, using a plurality of diagonal detectors, matching pattern portions across the pattern compare blocks that are arranged in a diagonal;
      detecting, using a packet boundary detector, when the matching pattern portions arranged in a diagonal indicate a matching pattern that falls within a set of packet boundaries; and
      indicating a positive match when the packet boundary detector indicates that the matching pattern falls within the set of packet boundaries.

2. The method of claim 1 wherein the pattern compare blocks each comprise a comparator.

3. The method of claim 1 wherein using the pattern compare blocks includes using each pattern compare block to compare its respective n-bit portion of data from the data bus to all of the n-bit pattern portions of the pattern.

4. The method of claim 1 wherein the pattern compare blocks are replicated for each of the n-bit portions of data on the data bus.

5. The method of claim 1 wherein detecting the matching pattern portions arranged in a diagonal includes detecting the matching pattern portions forming a complete matching pattern during the first clock cycle.

6. The method of claim 1 wherein detecting the matching pattern portions arranged in a diagonal includes detecting the matching pattern portions that form a partial matching pattern during the first clock cycle and a remainder of the matching pattern during a second clock cycle after the first clock cycle.

7. The method of claim 1 wherein the diagonal detectors comprise logic gates.

8. The method of claim 7 wherein the logic gates comprise AND gates.

9. The method of claim 1 comprising indicating a false match when the matching pattern portions arrange in a diagonal do not fall within a set of packet boundaries.

10. A system for wide bus pattern matching, the system comprising:
    a network equipment test device including at least one processor, the network equipment test device further including:
       a plurality of pattern blocks configured to compare each n-bit portion of data received from a data bus during a first clock cycle to a plurality of different n-bit pattern portions, n being an integer equal to a smallest boundary in which a pattern can start on the data bus;
       a plurality of diagonal detectors for detecting matching pattern portions across the pattern compare blocks that are arranged in a diagonal; and
       a packet boundary detector for detecting when the matching pattern portions arranged in a diagonal indicate a matching pattern that falls within a set of packet boundaries and indicating a positive match when the packet boundary detector indicates that the matching pattern falls within the set of packet boundaries.

11. The system of claim 10 wherein the pattern compare blocks each comprise a comparator.

12. The system of claim 10 wherein using the pattern compare blocks includes using each pattern compare block to compare its respective n-bit portion of data from the data bus to all of the n-bit pattern portions of the pattern.

13. The system of claim 10 wherein the pattern compare blocks are replicated for each of the n-bit portions of data on the data bus.

14. The system of claim 10 wherein detecting the matching pattern portions arranged in a diagonal includes detecting the matching pattern portions forming a complete matching pattern during the first clock cycle.

15. The system of claim 10 wherein detecting the matching pattern portions arranged in a diagonal includes detecting the matching pattern portions that form a partial matching pattern during the first clock cycle and a remainder of the matching pattern during a second clock cycle after the first clock cycle.

16. The system of claim 10 wherein the diagonal detectors comprise logic gates.

17. The system of claim 16 wherein the logic gates comprise AND gates.

18. The system of claim 10 comprising indicating a false match when the matching pattern portions arrange in a diagonal do not fall within a set of packet boundaries.

19. A non-transitory computer readable medium having stored thereon executable instructions that when executed by a processor of a computer control the computer to perform steps comprising:
    receiving, in a first clock cycle, a bus width of data from a data bus;
    using pattern compare blocks to compare each n-bit portion of data on the bus to a plurality of different n-bit pattern portions, n being an integer equal to a smallest quantity of data in which a pattern can start on the data bus;
    detecting, using a plurality of diagonal detectors, matching patterns across the pattern compare blocks that are arranged in a diagonal; and
    detecting, using a packet boundary detector, when a plurality of matching patterns arranged in a diagonal falls within a set of packet boundaries.

20. The non-transitory computer readable medium of claim 19 wherein detecting the matching pattern portions arranged in a diagonal includes detecting the matching pattern portions that form a partial matching pattern during the first clock cycle and a remainder of the matching pattern during a second clock cycle after the first clock cycle.

* * * * *